F. C. SANFORD.
CLUTCH.
APPLICATION FILED APR. 16, 1910.
981,885.
Patented Jan. 17, 1911.
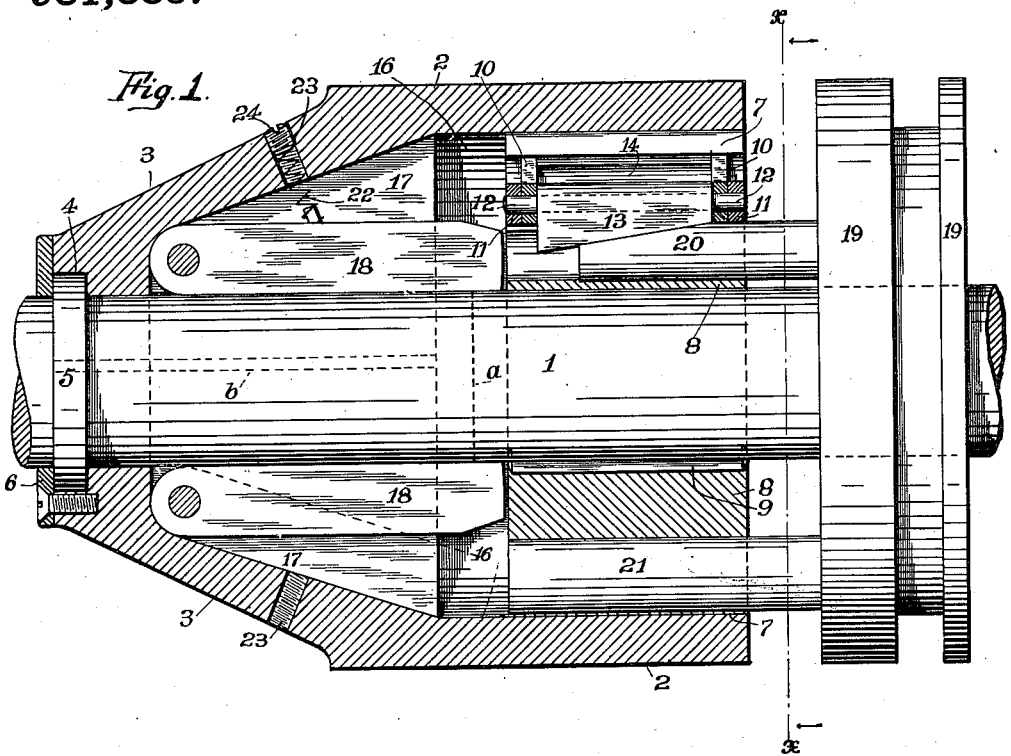
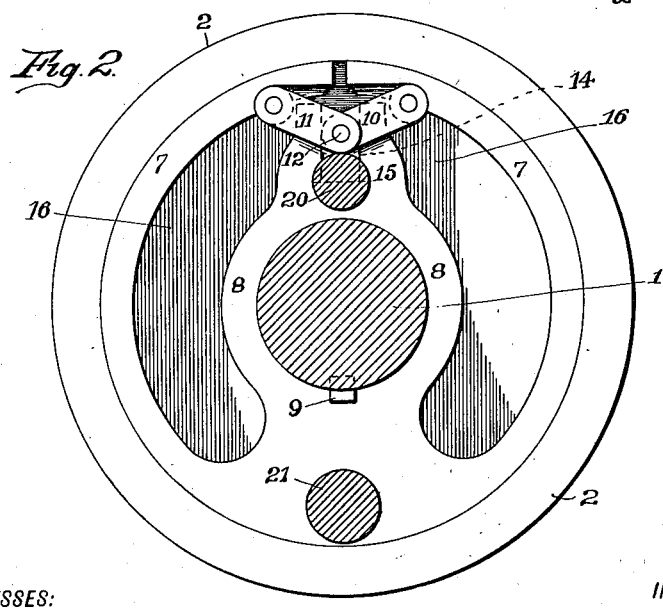
WITNESSES:
INVENTOR
F. C. Sanford.
BY
ATTORNEY

UNITED STATES PATENT OFFICE.

FRANK C. SANFORD, OF BRIDGEPORT, CONNECTICUT.

CLUTCH.

981,885. Specification of Letters Patent. Patented Jan. 17, 1911.

Application filed April 16, 1910. Serial No. 555,887.

*To all whom it may concern:*

Be it known that I, FRANK C. SANFORD, a citizen of the United States, residing at Bridgeport, county of Fairfield, and State of Connecticut, have invented certain new and useful Improvements in Clutches; and I do declare the following to be a full, clear, and exact description of the invention, such as will enable others skilled in the art to which it appertains to make and use the same.

My invention has reference to certain improvements in clutches, and has for its object to so combine a friction clutch and a positive clutch that the latter will be brought into operation without the slightest jar or shock, thus doing away with the disadvantages incident to the use of positive clutches.

With these ends in view my invention consists in the combination and arrangement of parts hereinafter fully set forth and then particularly pointed out in the claims which conclude this description.

In the accompanying drawing Figure 1 is a sectional elevation illustrating my improvement; and Fig. 2 a section at the line *x, x,* of Fig. 1.

Similar numerals of reference denote like parts in both figures of the drawing.

The chief disadvantage that has been incidental to the use of a positive clutch where the engagement of the clutch elements is instantaneous, is that such engagement is accompanied by more or less shock and jar, which, in many kinds of work, causes "chat-ters" or other imperfections and bad results. A friction clutch overcomes these disadvantages to a considerable degree, but the trouble with such a clutch is that there is usually more or less slipping between the driving and the driven elements which not only causes the engaging surfaces to become rapidly worn away, but in some instances the slipping is so pronounced that work on the machine cannot be properly performed or effected with sufficient expedition. It is therefore quite advantageous to so combine these two sets of clutches that all the advantages of a friction clutch are preserved, while the engagement of the positive driving and positive driven elements is effected without the slightest jar or shock, all of which will be understood from the following description.

1 is the power shaft and 2 a hollow head loosely supported around said shaft in any suitable and ordinary manner. In the present instance I have shown the rear portion or hub 3 of this head provided with a jog 4 within which loosely fits a collar 5 which is tight on the shaft 1, a retaining plate 6 being secured to the end of this hub so as to inclose the collar and thereby prevent any independent lengthwise movements of the head, but, as I said before, this head may be properly mounted around this shaft in any suitable and approved manner.

7 is a divided friction ring which closely conforms to the internal contour of the head without normally binding thereagainst, and this ring has a hub portion 8 which surrounds the shaft 1 and is rigidly secured thereto by means of a key 9.

10 are toggle levers pivoted at their outer extremities to opposite edges of said ring on one side of the split which divides the latter and 11 are similar toggle levers pivoted to opposite edges of such ring on the other side of said split, and the inner extremities of said levers are all pivoted around a pin 12 which extends in a plane immediately below said split. Tight on said pin and intermediate of said toggle is a block 13 having its lower surface wedge shaped, which block is contained within a gate 14 at the upper portion of an extension 15 from the hub 8.

The ring 7 does not completely fill the hollow part of the head 2, but in the immediate rear of said ring a space or recess 16 is left, and back of this recess the head is provided with slots 17 which open into said recess, and within these slots are pivoted dogs 18 whose forward extremities normally project through said slots into said recess and in proximity to the ring 7.

19 is the usual grooved clutch operating collar carried by the shaft 1 and slidable thereon, and extending inwardly from this collar loosely through suitable perforations in the extension 15 and in the lower portion of the ring 7 are pins 20, 21. The pin 20 has a beveled surface which engages the beveled surface of the block 13 when the collar is forced inwardly toward the head 2, thereby operating the toggles to effect the spreading of the ring 7 and the consequent frictional engagement thereof with said head whereby the latter may be revolved; the pin 21, when the collar is forced inwardly toward the head 2, will be projected within the recess 16 and would ordinarily be carried all around throughout the entire circuit of this recess owing to the slipping between the friction clutch and the head, but, in the present instance, the speed at which the head is driven will cause the dogs 18 to be thrown outwardly by centrifugal force within the path of travel of this pin 21, so that when the latter finally overtakes one of said dogs it will come into engagement therewith without the slightest jar or shock, and thereafter the head will be driven positively.

If desired, a light spring 22, contained within a suitable perforation 23 in the hub portion of the head and backed by a tension controlling screw 24 and bearing against the dogs, may be employed to render the latter more or less susceptible to centrifugal force as illustrated in the instance of one of the dogs at Fig. 1, but this is merely an adjunctive feature and is in the nature of a device fully within the range of ordinary mechanical skill and forms no part of my present invention.

The power pulley is not illustrated herein, since it forms no part of my invention and may be secured to the head 2 in any suitable and ordinary manner.

While I have illustrated in the drawings two dogs which serve as the positive abutting elements carried by the head, it will be clear that one dog is sufficient for the purpose of my invention, or the number of these dogs may even be increased if desired, and I do not desire to be limited in this respect although I prefer to use a pair of dogs since the engagement of the positive abutting surfaces is apt to be accomplished more quickly, and, moreover, if one dog should break or become inoperative for any reason, the remaining dog would always insure a proper clutching of the positive abutting elements.

I have shown and described a style of friction clutch which is old and well known, and in this connection I would say that any suitable conventional form of friction clutch would subserve the purposes of my invention, the gist of which rests in the broad idea of combining a friction clutch with a positive clutch.

Instead of employing a single shaft 1 with the head loosely supported therearound, said shaft may be divided, as, for instance, at the dotted line a, shown at Fig. 1, and said head then rigidly secured to the rear section of said shaft as by a key shown at b in dotted lines in said figure, such a construction being a mechanical equivalent well within the province of my invention.

Having thus described my invention what I claim as new and desire to secure by Letters Patent is:—

1. A clutch comprising a power shaft, a hollow rotary head loose on said shaft, a slidable collar revolving with said shaft, a friction clutch carried by said shaft, means carried by said collar whereby the sliding of the latter will cause said clutch to engage with and disengage from said head, dogs pivoted within said head and capable of free movements from their pivotal points whereby they may be thrown outwardly by centrifugal force, and an element operated by said collar and adapted to be thrust within or withdrawn from the field of said dogs.

2. A clutch comprising a power shaft, a hollow rotary head loose on said shaft, a friction clutch carried by said shaft within said head, positive abutting devices pivoted within said head and capable of free movements from their pivotal points whereby they may be thrown outwardly by centrifugal force, means carried by said shaft and operated to cause the engagement of said friction clutch and head, and an element likewise carried by said shaft into position for impact against said abutting devices.

3. A clutch comprising a power shaft, a hollow rotary head loose on said shaft, a slidable collar revolving with said shaft, a friction clutch carried by said shaft, means carried by said collar for operating said friction clutch, an abutting element carried by said collar and adapted thereby to be forced inwardly, and an abutment pivoted within said head and capable of free movements from its pivotal point whereby it may be thrown outwardly by centrifugal force in the path of said abutting element whereby said head may be positively driven.

4. A clutch comprising a power shaft, a hollow rotary head loose on said shaft, a slidable collar revolving with said shaft, a friction clutch carried by said collar for operating said friction clutch, an abutting element carried by said collar and partaking of the movements thereof, and an abutment carried by said head and rigid therewith as to rotary movements but capable of radial movements with respect to said shaft whereby said abutment may be thrown outwardly by centrifugal force in the path of said abutting element.

In testimony whereof I affix my signature in presence of two witnesses.

F. C. SANFORD.

Witnesses:
F. W. SMITH, Jr.,
M. T. LONGDEN